United States Patent
Spiegel et al.

(10) Patent No.: US 12,345,291 B2
(45) Date of Patent: Jul. 1, 2025

(54) SINGLE SLOT LOADER SLOT BEARING

(71) Applicant: Roller Bearing Company of America, Inc., Oxford, CT (US)

(72) Inventors: Jonathan Spiegel, Oxford, CT (US); Stephen Sorgenti, Oxford, CT (US); Jackson Sarneski-Hayes, Oxford, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 18/608,590

(22) Filed: Mar. 18, 2024

(65) Prior Publication Data
US 2024/0218903 A1 Jul. 4, 2024

Related U.S. Application Data

(63) Continuation of application No. 17/676,984, filed on Feb. 22, 2022, now Pat. No. 11,933,354.
(Continued)

(51) Int. Cl.
*F16C 11/06* (2006.01)
*F16C 23/04* (2006.01)

(52) U.S. Cl.
CPC ...... *F16C 11/0614* (2013.01); *F16C 11/0685* (2013.01); *F16C 23/045* (2013.01); *F16C 2202/04* (2013.01); *F16C 2220/04* (2013.01)

(58) Field of Classification Search
CPC .......... F16C 11/0614; F16C 11/0685; F16C 23/045; F16C 2202/04; F16C 2220/04
See application file for complete search history.

(56) References Cited

U.S. PATENT DOCUMENTS

| | | | |
|---|---|---|---|
| 2,904,874 | A | 9/1959 | Norton |
| 2,995,813 | A | 8/1961 | Board, Jr. |

(Continued)

FOREIGN PATENT DOCUMENTS

| | | |
|---|---|---|
| CN | 1928375 A | 3/2007 |
| EP | 2157325 A2 | 2/2010 |

(Continued)

OTHER PUBLICATIONS

Extended European Search Report issued in corresponding EP Application No. 22157647.4, dated Jul. 8, 2022, pp. 1-9.

*Primary Examiner* — Phillip A Johnson
(74) *Attorney, Agent, or Firm* — Ruggiero McAllister & McMahon LLC (57) ABSTRACT

A loader slot bearing includes a housing and a truncated ball. The housing has an interior area that is defined by an inner bearing surface which has a concave contour defining a circumference. A single slot extends axially partway into the inner bearing surface and has a slot arc section area extending axially inward. The slot arc section area has a first circumferential slot-end, a second circumferential slot-end, and a slot arc length measured between the first circumferential slot-end and the second circumferential slot-end. A ratio of the slot arc length to the circumference of the interior area is about 0.20 to 0.35. The truncated ball has a convex exterior surface. The truncated ball is positioned in the slot and rotated so that the truncated ball is rotatably retained by the inner bearing surface. The truncated ball is angularly misalignable relative to the annular housing.

12 Claims, 10 Drawing Sheets

Related U.S. Application Data (60) Provisional application No. 63/152,619, filed on Feb. 23, 2021.

(56) References Cited

U.S. PATENT DOCUMENTS

| | | | |
|---|---|---|---|
| 3,191,265 | A | 6/1965 | McCloskey |
| 3,287,071 | A | 11/1966 | Tucker |
| 3,365,249 | A | 1/1968 | McCloskey |
| 3,589,779 | A | 6/1971 | Sokol et al. |
| 3,940,836 | A | 3/1976 | McCloskey |
| 3,960,416 | A | 6/1976 | McCloskey |
| 4,116,504 | A | 9/1978 | Cass |
| 4,248,486 | A | 2/1981 | Bradley |
| 5,005,991 | A | 4/1991 | Heumann et al. |
| 5,524,987 | A | 6/1996 | Vigeh |
| 6,352,368 | B1 | 3/2002 | James |
| 8,876,390 | B2 | 11/2014 | McNeil |
| 9,261,132 | B2 | 2/2016 | McNeil |
| 9,863,465 | B2 | 1/2018 | Boston et al. |
| 9,964,141 | B2 | 5/2018 | Chopra et al. |
| 10,788,073 | B1 | 9/2020 | McNeil et al. |
| 2002/0168122 | A1 | 11/2002 | Kletzli |
| 2009/0080818 | A1 | 3/2009 | Sasaki et al. |
| 2009/0097787 | A1 | 4/2009 | Richard et al. |
| 2017/0292563 | A1 | 10/2017 | Boston |
| 2020/0370602 | A1 | 11/2020 | Monserratt et al. |

FOREIGN PATENT DOCUMENTS

| | | | |
|---|---|---|---|
| EP | 3587846 A1 * | 1/2020 | ........... B64C 25/001 |
| JP | 3202447 | 2/2016 | |

* cited by examiner

SINGLE SLOT LOADER SLOT BEARING

CROSS REFERENCE TO RELATED APPLICATIONS

This application is a continuation of U.S. application Ser. No. 17/676,984 filed on Feb. 22, 2022 that granted on Mar. 19, 2024 as U.S. Pat. No. 11,933,354, which is a non-provisional application of U.S. Provisional No. 63/152,619, filed on Feb. 23, 2021, the entire contents of all of which are incorporated herein by reference in their entirety.

BACKGROUND

1. Field of the Invention

The present disclosure relates generally to a rod end having a loader slot spherical bearing therein. More particularly, the present disclosure relates to an injection molded loader slot spherical bearing having a single slot therein for a rod end. The slot is aligned with, and extends toward, the shaft of the rod end.

2. Description of Related Art

Rod ends having loader slot bearings therein typically have a rod end head, a rod end shank (or shaft), and a rod end bore in the rod end head. Typical loader slot bearings have two slots in the bore at the three o'clock and nine o'clock positions of the rod end head, with the rod end shank at the six o'clock position. In typical injection molded loader slot designs, the race material is molded into the slots after the ball is aligned in place such that there is no metal retaining the ball in the area of the slots when the ball is axially loaded toward the slots. However, when the ball is axially loaded toward the slots, the plastic molded material of the slots reduces the load capacity. In typical two slot loader slot bearing designs, the slots account for about two hundred degrees of the area surrounding the ball. Thus, more than half of the ball loses metal retainment, which reduces axial load capacity. Also, when the ball is axially loaded toward the non-slotted areas, about half of the ball is in contact with metal and the other half is in contact with plastic. The metal-to-metal contact helps retain the ball during axial loads and keeps the rod end stiff during radial (tension) loads. While this metal-to-metal contact is good for static load capacity, it increases the wear on the bearing.

Thus, there is a need for an improved loader slot bearing that overcomes the foregoing problems.

SUMMARY

According to aspects illustrated herein, there is provided a loader slot bearing including an annular housing and a truncated ball. The annular housing has a first axial housing-surface, a second axial housing-surface, and an interior area extending between the first axial housing-surface and the second axial housing-surface. The interior area is defined by an inner bearing surface that extends between the first axial housing-surface and the second axial housing-surface. The inner bearing surface has a concave contour (e.g., elliptical, arcuate, or spherical) defining a circumference measured proximate to the first axial housing-surface. A single slot extends axially partway into the inner bearing surface from the first axial housing-surface. The slot has a slot arc section area extending axially inward from the first axial housing-surface. The slot arc section area has a first circumferential slot-end, a second circumferential slot-end, and a slot arc length measured between the first circumferential slot-end and the second circumferential slot-end. A ratio of the slot arc length to the circumference of the interior area is about 0.20 to about 0.35. The truncated ball has a convex spherical exterior surface extending between a first axial ball-surface and a second axial ball-surface. The truncated ball is positioned in the slot and rotated so that the truncated ball is rotatably retained by the inner bearing surface. The truncated ball is angularly misalignable relative to the annular housing.

In one embodiment, the slot has a first lateral width measured between the first circumferential slot-end and the second circumferential slot-end, and the truncated ball has a first axial width measured between the first axial ball-surface and the second axial ball-surface. The first axial width is less than the first lateral width.

In one embodiment, the slot arc section area has a first radius, and the spherical exterior surface has a first outer diameter. The first radius is greater than the first outer diameter divided by 2.

In one embodiment, the inner bearing surface has a first center of curvature, and the slot arc section area has a second center of curvature. The second center of curvature is positioned a distance from the first center of curvature.

In one embodiment, the annular housing has a second axial width measured between the first axial housing-surface and the second axial housing-surface, and the slot has a first axial depth extending from the first axial housing-surface toward the second axial housing-surface. A ratio of the first axial depth to the second axial width is about 0.40 to about 0.60.

In one embodiment, the inner bearing surface includes a radial groove centrally located axially between the first axial housing-surface and the second axial housing-surface and extending circumferentially around the interior area.

In one embodiment, the slot includes a notch extending radially outward into the annular housing. The notch has a first radial depth.

In one embodiment, an insert is positioned in the slot. The insert has an insert arc section area that conforms in shape to the slot arc section area.

In one embodiment, the truncated ball has a cylindrical bore extending between the first axial ball-surface and the second axial ball-surface. The bore is defined by an interior ball-surface.

In one embodiment, the truncated ball is dropped into the interior area of the annular housing.

In one embodiment, a liner is molded between the truncated ball and the annular housing.

In one embodiment, the liner is molded over an insert that is positioned in the slot.

In one embodiment, the liner is formed of an injection-moldable material.

In one embodiment, an insert is positioned in the slot and a liner is molded between the truncated ball and the annular housing. The liner has a first hardness and the insert has a second hardness that is greater than the first hardness.

In one embodiment, the slot extends circumferentially from the first circumferential slot-end to the second circumferential slot-end. The inner bearing surface extends continuously circumferentially a bearing surface arc length outside of the slot from the first circumferential slot-end to the second circumferential slot-end.

In one embodiment, the bearing surface arc length is defined by a ratio of the bearing surface arc length to the circumference of the interior area about 0.65 to about 0.80, to provide support for the truncated ball.

In some embodiments, the concave contour is elliptical.

According to aspects illustrated herein, there is provided a rod end including a loader slot bearing and a shaft. The loader slot bearing includes an annular housing and a truncated ball. The annular housing has a first axial housing-surface, a second axial housing-surface, and an interior area extending between the first axial housing-surface and the second axial housing-surface. The interior area is defined by an inner bearing surface that extends between the first axial housing-surface and the second axial housing-surface. The inner bearing surface has a concave contour (e.g., elliptical, arcuate, or spherical) defining a circumference measured proximate to the first axial housing-surface. A single slot extends axially partway into the inner bearing surface from the first axial housing-surface. The slot has a slot arc section area extending axially inward from the first axial housing-surface. The slot arc section area has a first circumferential slot-end, a second circumferential slot-end, and a slot arc length measured between the first circumferential slot-end and the second circumferential slot-end. A ratio of the slot arc length to the circumference of the interior area is about 0.20 to about 0.35. The truncated ball has a convex spherical exterior surface extending between a first axial ball-surface and a second axial ball-surface. The truncated ball is positioned in the slot and rotated so that the truncated ball is rotatably retained by the inner bearing surface. The truncated ball is angularly misalignable relative to the annular housing. The shaft has a longitudinal axis and extends from and is integral with the annular housing. The slot is centrally located along the longitudinal axis.

In one embodiment, the slot is located adjacent to the shaft.

In one embodiment, the inner bearing surface has a first center of curvature, and the slot arc section area has a second center of curvature. The second center of curvature is positioned a distance from the first center of curvature. The second center of curvature is located closer to the shaft than the first center of curvature.

In one embodiment, an insert is positioned in the slot and a liner is molded between the truncated ball and the annular housing. The liner has a first hardness and the insert has a second hardness that is greater than the first hardness.

In some embodiments, the concave contour is elliptical.

Any of the foregoing embodiments may be combined.

DESCRIPTION OF THE DRAWINGS

Referring now to the Figures, which are exemplary embodiments, and wherein the like elements are numbered alike.

DETAILED DESCRIPTION

Figure 1:
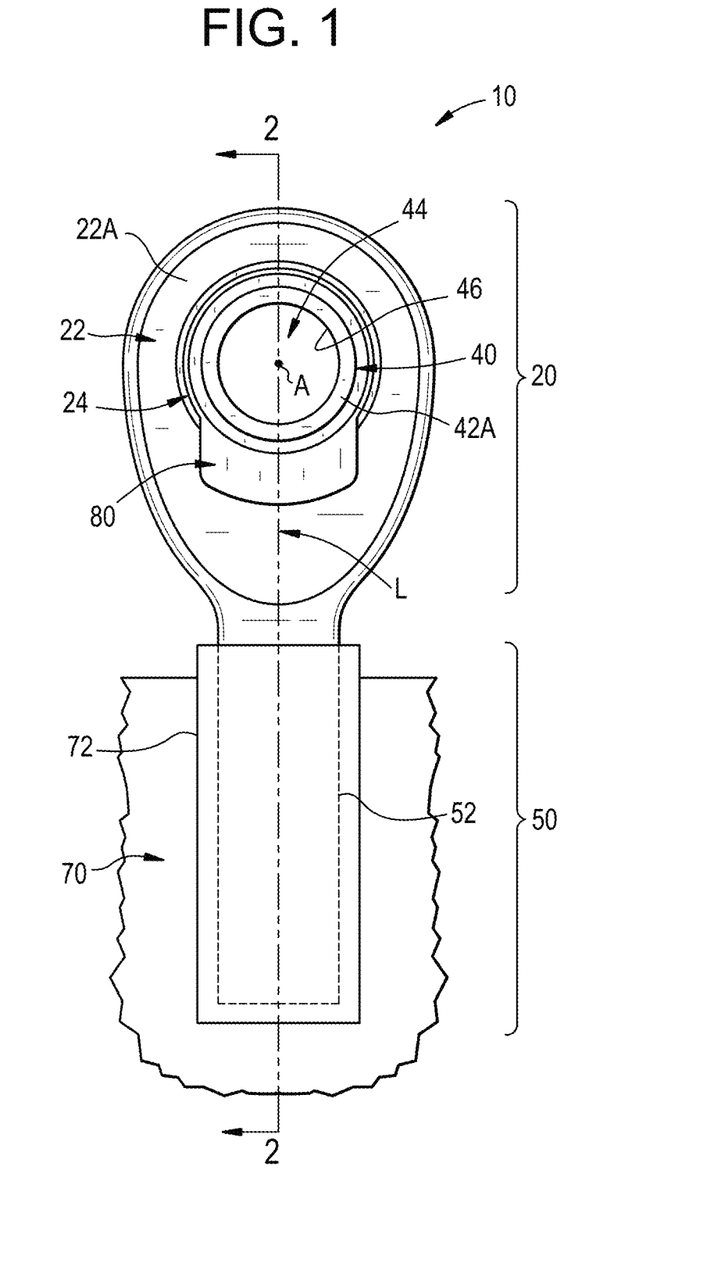
FIG. 1 is a side view of a rod end with a loader slot spherical bearing therein according to an embodiment of the present invention.

As shown in FIG. 1, a rod end is generally designated by the number 10. The rod end 10 includes a loader slot bearing 20 having an annular housing 22. A shaft 50 extends from and is integral with the annular housing 22 and thereby forms the rod end 10. The shaft 50 has a threaded area 52 (e.g., male threads) for threading the rod end 10 into a female thread 72 of a support frame 70. While the shaft 50 is shown secured to the support frame 70 via the threaded area 52 and the female threads 72, the present invention is not limited in this regard as the shaft 50 may be integral with the support frame 70 or secured to the support frame 70 with one or more alternative fasteners such as a shaft with female threads threaded on to a male threaded pin extending from the support frame 70, a flanged connection, or welded to the support frame 70.

While the loader slot bearing 20 is shown and described with reference to FIG. 1 as being integral with the shaft 50, the present invention is not limited in this regard as the shaft 50 may be eliminated resulting in a cartridge type loader slot bearing 200 as shown and described with reference to FIGS. 9 and 10. The loader slot bearing 200 is similar to the loader slot bearing 20 and employs similar reference numerals corresponding to the respective elements thereof and illustrates a cylindrical outside surface 22E of the annular housing 22 of the slot loader bearing 200. Therefore, the following description applies to both the slot loader bearing 20 and the slot loader bearing 200, as appropriate.

The annular housing 22 and the shaft 50 are manufactured from a metallic material, such as, a stainless steel (e.g., an austenitic, martensitic or precipitation hardened stainless steel), a bearing steel (e.g., ASTM 52100), a carbon steel (e.g., C1018), an alloy steel (e.g., 4130), aluminum (e.g., 6061), Inconel or a titanium based alloy. In some embodiments, the annular housing 22 and the shaft 50 are manufactured from a polymer based material, such as, nylon, acetal, polyetheretherketone, acrylonitrile butadiene styrene, polytetrafluoroethylene, and thermoplastic elastomer, with or without additives such as glass filler, fibers, lubricants, oil, greases, graphite, or any other known filler materials.

Figure 2:
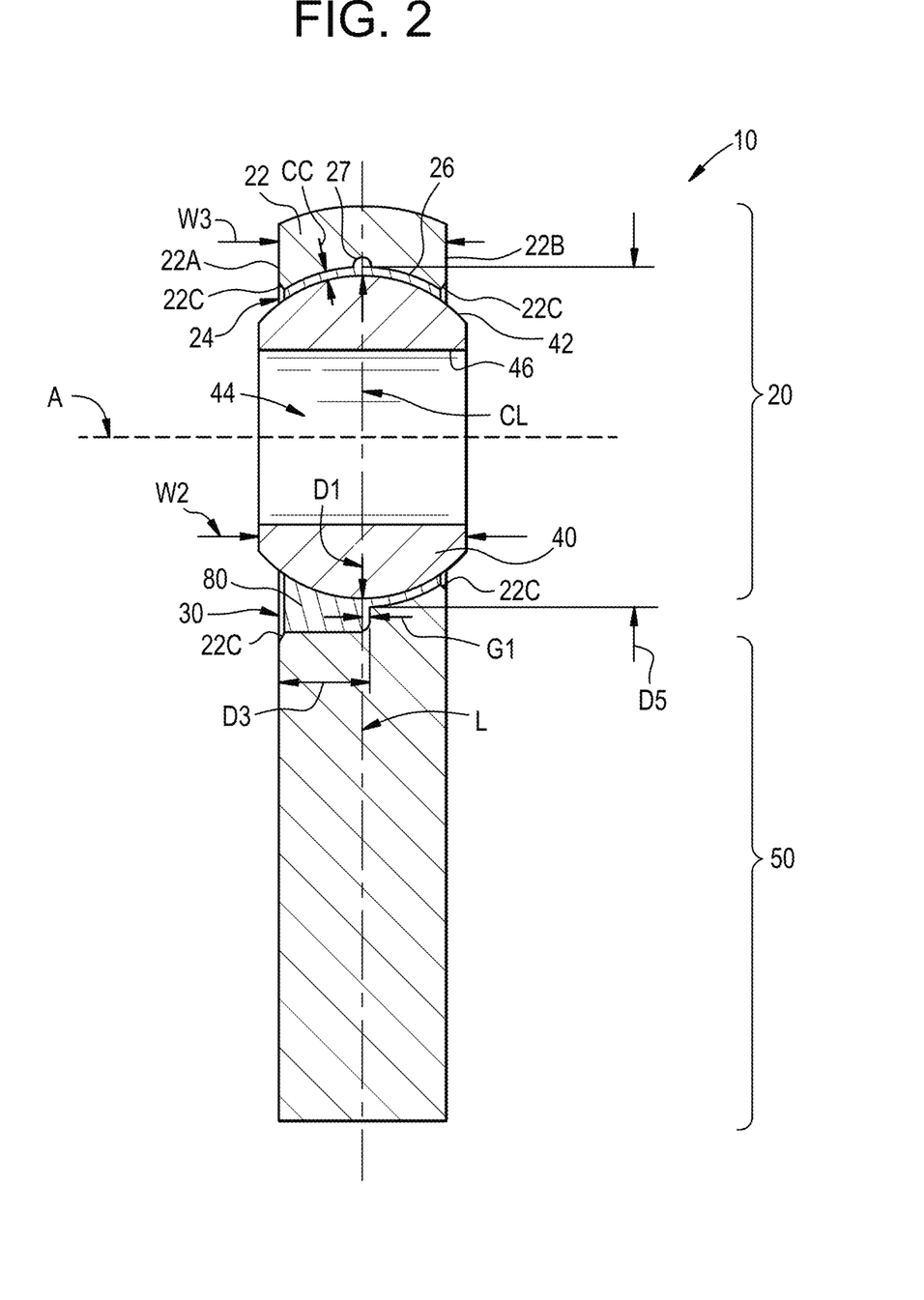
FIG. 2 is a cross sectional view of the rod end and loader slot bearing of FIG. 1, taken across section 2-2 of FIG. 1.
Figure 3:
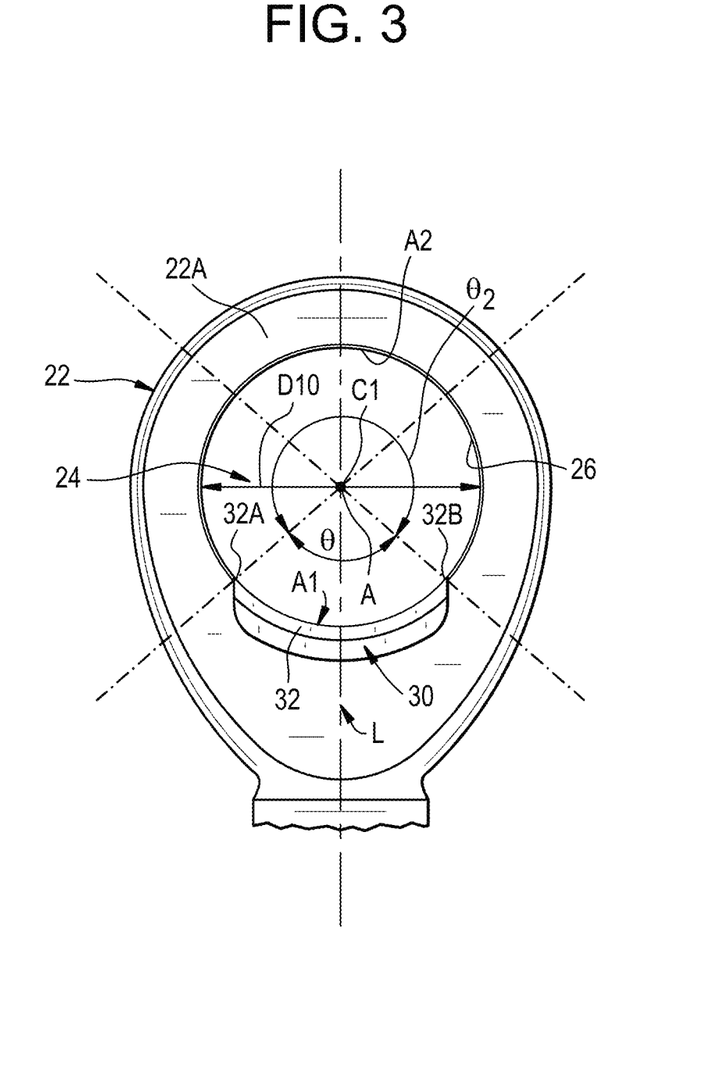
FIG. 3 is an enlarged view of a portion of the rod end of FIG. 1 shown without the truncated ball.
Figure 4:
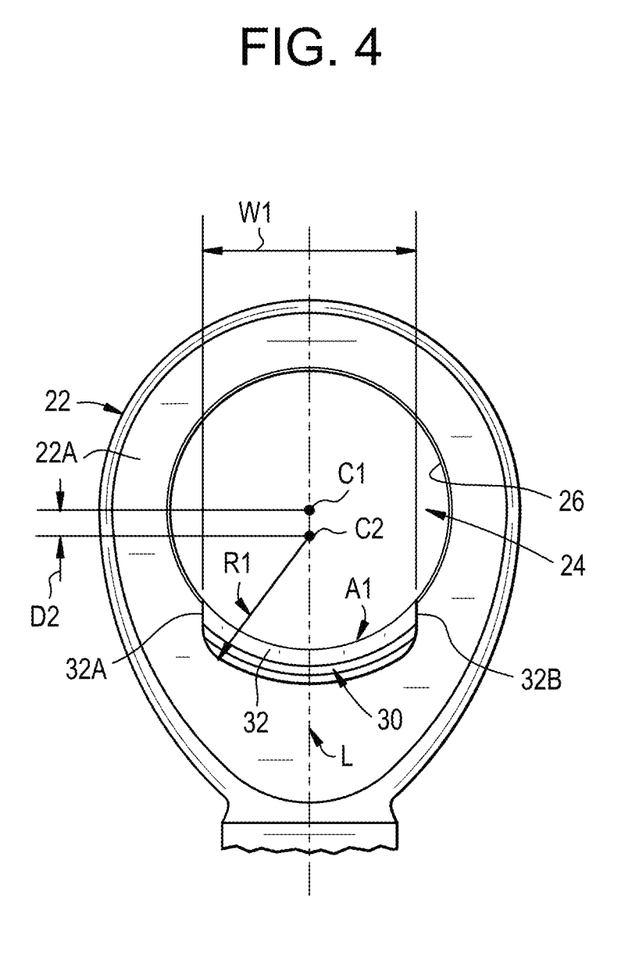
FIG. 4 is an enlarged view of a portion of the rod end of FIG. 1 shown without the truncated ball.
Figure 5:
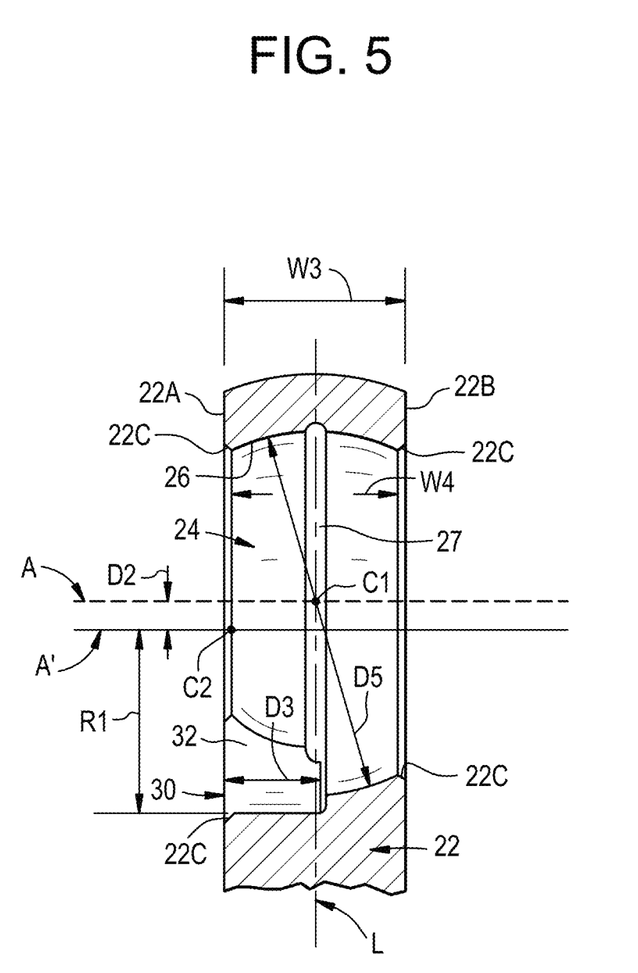
FIG. 5 is a cross sectional view of the loader slot bearing of FIG. 2 shown without the truncated ball.

As shown in FIG. 2, the annular housing 22 has a first axial housing-surface 22A, a second axial housing-surface 22B and an interior area 24 extending between the first axial housing-surface 22A and the second axial housing-surface 22B. The annular housing 22 has an axial width W3 as measured between the first axial housing-surface 22A and the second axial housing-surface 22B. In one embodiment, each of the first axial housing-surface 22A and the second axial housing-surface 22B have a chamfer 22C formed on a radially innermost portion thereof. The interior area 24 is defined by an inner bearing surface 26 that extends between the first axial housing-surface 22A and the second axial housing-surface 22B. As shown in FIGS. 3-4, the inner bearing surface 26 has a concave contour that defines a radially inward facing surface area and a circumference of the interior area 24 measured proximate to the first axial housing-surface 22A. In some embodiments, the inner bearing surface 26 has a concave elliptical contour. In some embodiments, the inner bearing surface 26 has a concave spherical contour. The radially inward facing surface area of the inner bearing surface 26 is continuous and uninterrupted with the exception of a single slot 30, as described further herein. The inner bearing surface 26 has a first center of curvature C1 that is located at the intersection of an axially extending central axis A of the interior area 24 and a radially extending longitudinal axis L. As shown in FIG. 5, the inner bearing surface 28 has an effective axial width W4 that extends between respective axial inward portions of the chamfers 22C of the first axial housing-surface 22A and the second axial housing-surface 22B. The annular housing 22 has an opening proximate to each of the first axial housing-surface 22A and the second axial housing-surface 22B at the minimum inside diameter at the peak of the chamfer 22C which each have an inside diameter D10 as shown for example in FIG. 3. In some embodiments, the inner bearing surface 26 has a radial groove 27 formed therein, as illustrated in FIGS. 2, 5, 6, 7, and 8. The radial groove 27 is centrally located axially between the first axial housing-surface 22A and the second axial housing-surface 22B as measured along the width W3, and the radial groove 27 extends circumferentially around the interior area 24. The radial groove 27 provides additional axial retention of a liner 80 molded between a truncated ball 40 and the annular housing 22. The slot 30 provides additional rotational retention of the liner 80 molded between the truncated ball 40 and the annular housing 22. In the embodiment with the radial groove 27, the radially inward facing surface area of the inner bearing surface 26 is continuous and uninterrupted with the exception of the slot 30 and the radial groove 27. While the radial groove 27 is shown and described as being centrally located axially between the first axial housing-surface 22A and the second axial housing-surface 22B, the present invention is not limited in this regard other configurations are contemplated including but not limited to the radial groove 27 being asymmetrically located between the first axial housing-surface 22A and the second axial housing-surface 22B and the axial groove being circumferentially non-continuous and configured in two or more segments.

As best shown in FIGS. 3-5, the slot 30 extends partially and axially (i.e., parallel to the central axis A) into the inner bearing surface 26 from the first axial housing-surface 22A. As shown in FIG. 4, the slot 30 has a lateral width W1 extending perpendicular to a longitudinal axis L of the rod end 10 and parallel to the first axial housing-surface 22A. In some embodiments, the slot 30 is centrally located laterally along the longitudinal axis L (i.e. the longitudinal axis L bisects the slot 30 as measured along the lateral width W1). As shown in FIG. 5, the slot 30 extends an axial depth D3 that extends axially inward from the first axial housing-surface 22A towards and terminating prior to the second axial housing-surface 22B. A ratio of the axial depth D3 of the slot 30 to the axial width W3 of the inner bearing surface 26 is about 0.40 to about 0.60. As shown in FIGS. 3-4, the slot 30 defines a radially inward facing slot arc section area 32. The slot arc section area 32 has a first circumferential slot-end 32A and a second circumferential slot-end 32B defining a slot arc length A1 measured between the first circumferential slot-end 32A and the second circumferential slot-end 32B. As shown in FIGS. 4 and 5, the slot arc section area 32 has a first radius of curvature RI measured from a second center of curvature C2 located on a line parallel to and offset from the central axis A to the radially outermost surface of the slot 30, as described further herein. As shown in FIG. 3, the slot arc length A1 extends a circumferential distance along the circumference of the interior area 24 (i.e., the radially innermost portion of the slot 30). The circumferential distance of the slot arc length A1 is defined by an angle $\theta$ as measured between the radially inner most portion of the first circumferential slot-end 32A and the radially inner most portion of the second circumferential slot-end 32B. The angle $\theta$ is swung from the central axis A. In some embodiments, the angle $\theta$ is between about 75 degrees to about 120 degrees, and preferably about 98 degrees, of the circumference of the interior area 24. A ratio of the slot arc length A1 to the circumference of the interior area 24 measured at the first axial housing-surface 22A is about 0.20 to about 0.35, and preferably about 0.27. As shown in FIGS. 4 and 5, the second center of curvature C2 and the line parallel to and offset from the central axis A is offset from the central axis A by a radial distance D2, the radial distance D2 extending from the central axis A to a central offset axis A', as best shown in FIG. 5. In some embodiments, the distance D2 is not to exceed 0.030 inches. In some embodiments of the rod end 10, the slot 30 is located adjacent to the shaft 50. In some embodiments, the inner bearing surface 26 has the first center of curvature C1, and the slot arc section area A1 has the radius of curvature RI measured from the second center of curvature C2. The second center of curvature C2 is positioned a distance D2 from the first center of curvature C1 as best shown in FIG. 5 and for the rod 10 embodiments, the second center of curvature C2 is located closer to the shaft 50 than the first center of curvature C1. It has been surprisingly discovered that the benefit of having the second center of curvature C2 below (i.e., radially outward from) the first center of curvature C1 is that this configuration facilitates assembly because the spherical exterior surface 42 of the truncated ball 40 (see FIG. 2) has a first outer diameter D1 that is as close as possible in magnitude to the first inner diameter D5 of the interior area 24 of the annular housing 22. Thus, in the configuration where the second center of curvature C2 is below the first center of curvature C1, there is extra space for the truncated ball 40 to be placed within the housing 22.

As shown in FIG. 3, the slot arc length A1 of the slot 30 extends circumferentially from a first circumferential slot-end 32A to a second circumferential slot-end 32B and the inner bearing surface 26 extends continuously circumferentially a bearing surface arc length A2 outside of the slot 30 (e.g., proximate the first axial housing-surface 22A) from the first circumferential slot-end 32A to a second circumferential slot-end 32B spanning an angle $\theta 2$ as measured between the first circumferential slot-end 32A and the second circumferential slot-end 32B from the first center of curvature C1 (e.g., measured at the first axial housing-surface 22A). In some embodiments, the angle $\theta 2$ is between about 240 degrees to about 285 degrees, and preferably about 262 degrees, of the circumference of the interior area 24 measured at the first axial housing-surface 22A. The bearing surface arc length A2 is defined by a ratio of the bearing surface arc length A2 to the circumference of the interior area, the measured at the first axial housing-surface 22A, about 0.65 to about 0.80, to provide support for the truncated ball.

Figure 6:
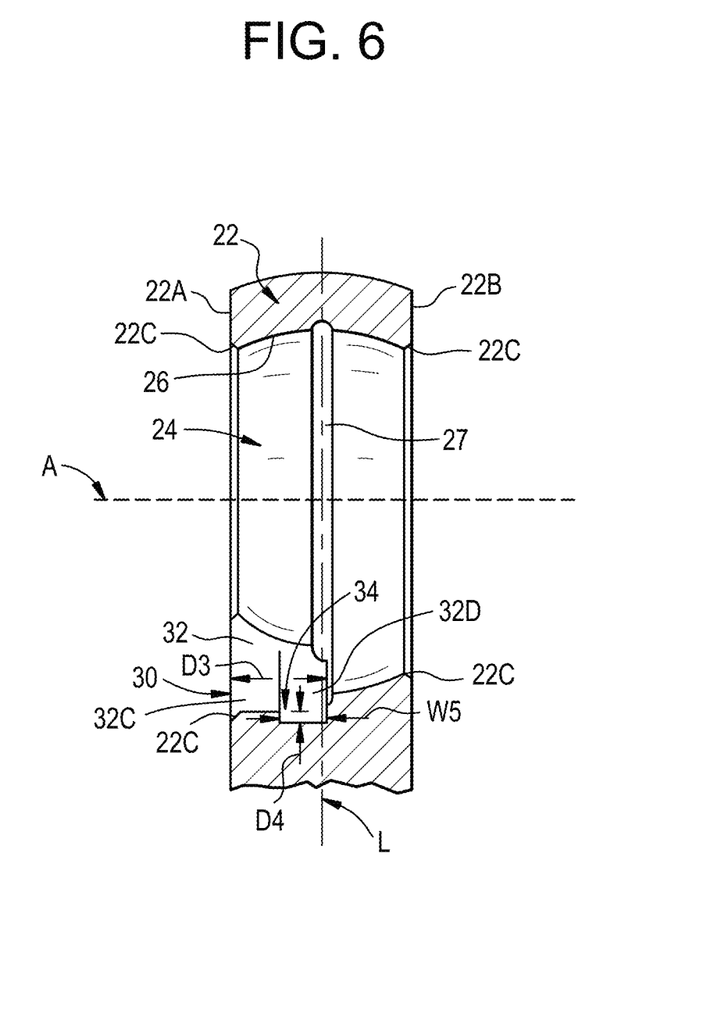
FIG. 6 is a cross sectional view of a loader slot bearing having a notch in the slot of the annular housing according to an embodiment of the present invention.

As shown in FIG. 6, in some embodiments, the slot 30 has a notch 34 that extends radially outward from the inner bearing surface 26 and extends circumferentially only in the slot 30 along the slot arc section area 32. The slot arc section area 32 has a first axial section slot-area 32C proximate the first axial housing-surface 22A, and a second axial section slot-area 32D extending axially inward from the first axial section slot-area 32C. The notch 34 is formed in the second axial section slot-area 32D and extends radially outward a radial depth D4 as measured parallel to the longitudinal axis L. The notch 34 extends axially partway in the slot 30 an axial width W5 which is less that the axial depth D3 of the slot. In some embodiments, the radial depth D4 is between about 0.040 inches to about 0.100 inches. The notch 34 is configured to further improve retention of a molded liner 80 or insert 60, as discussed below, when the loader slot bearing 20 is axially loaded.

While the loader slot bearing 20 is shown in FIGS. 1-6 and described as having a slot 30 that has particular dimensions, shape, and orientation in the annular housing 22, the present invention is not limited in this regard and includes other configurations including but not limited to the slot 30 being arranged in different positions along the first axial housing-surface 22A, and the slot arc section area 32 having a smaller or a larger slot arc length A1.

Figure 7:
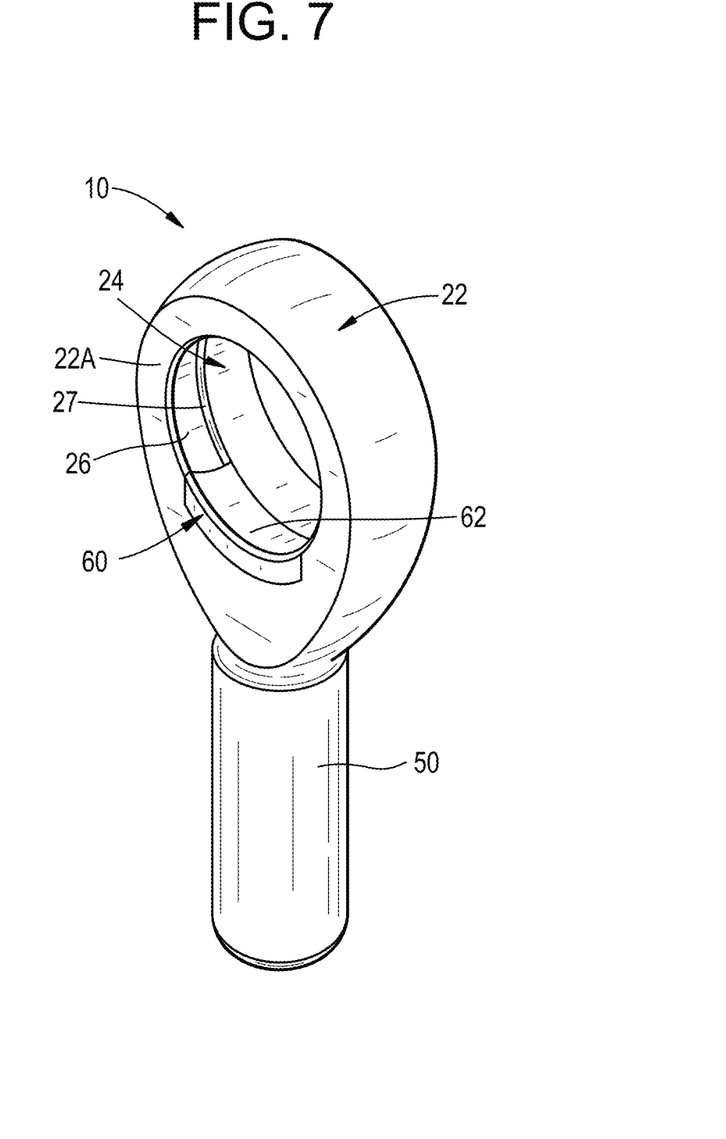
FIG. 7 is a perspective view of a rod end having an insert positioned in the slot of the annular housing according to an embodiment of the present invention, but with no liner or truncated ball shown for clarity of illustration.
Figure 8:
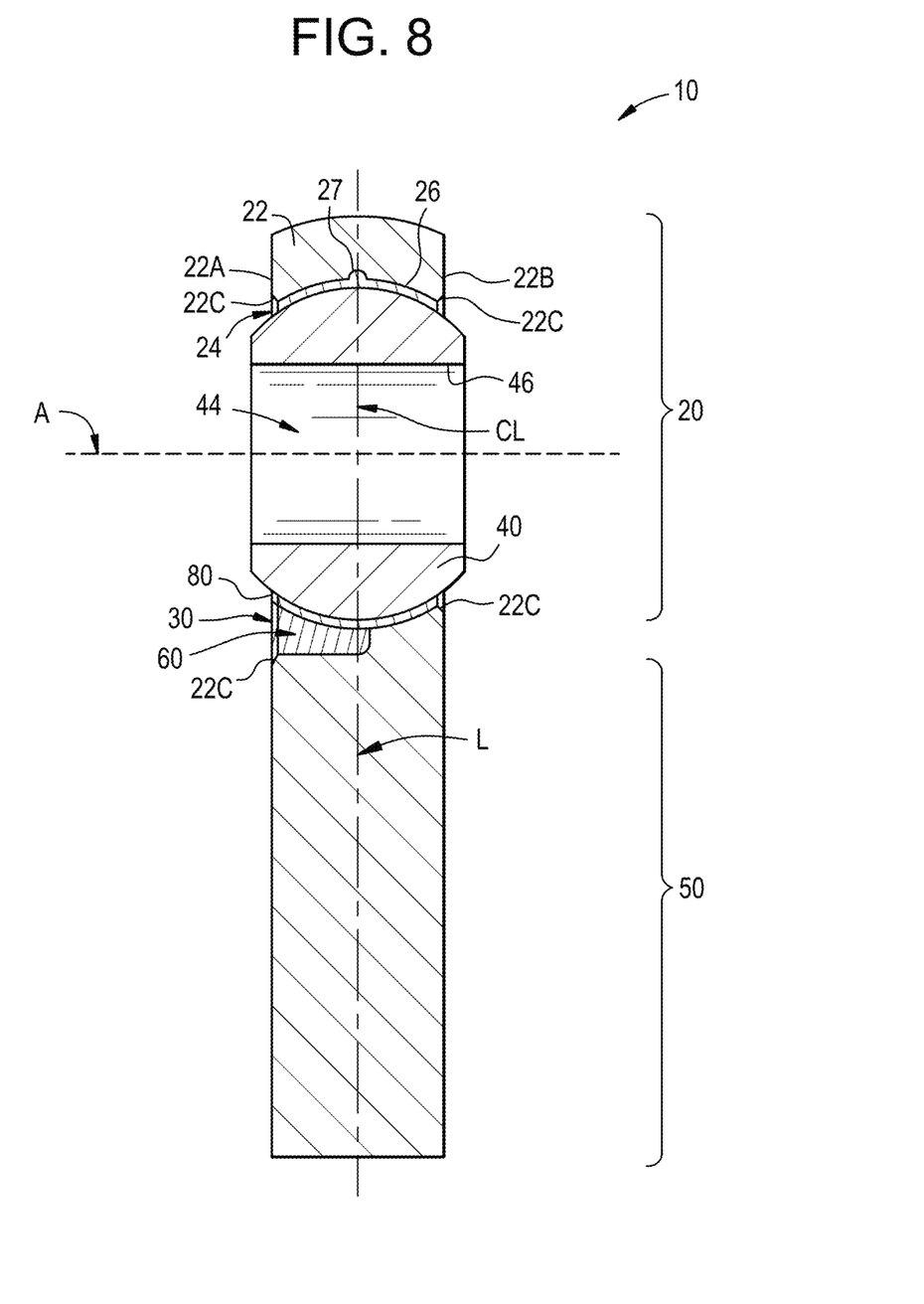
FIG. 8 is a cross sectional view of the rod end of FIG. 7 shown with the liner, insert, and truncated ball.

In some embodiments, as shown for example in FIGS. 7-8, the slot 30 is configured to receive an insert 60. The insert 60 is preferably formed of a material that is harder than the molded liner 80. For example, in some embodiments, the insert 60 is formed of a metallic material, such as, brass, stainless steel (e.g., an austenitic, martensitic or precipitation hardened stainless steel), bearing steel (e.g., ASTM 52100), carbon steel (e.g., C1018), alloy steel (e.g., 4130), aluminum (e.g., 6061), Inconel or a titanium based alloy, or a hard plastic material, such as, nylon, acetal, polyetheretherketone, acrylonitrile butadiene styrene, polytetrafluoroethylene, and thermoplastic elastomer, with or without additives such as glass filler, fibers, lubricants, oil, greases, graphite, or any other known filler materials. The insert 60 has an insert arc section area 62 that conforms in shape to the slot arc section area 32. In some embodiments, the insert 60 has a tab (not shown) that is complementary in shape to the notch 34 of the slot 30 such that the tab is snap fit and retained in the notch 34 to secure the insert 60 in the slot 30. The insert 60 is configured to snap fit into the slot 30 to further improve both the axial and radial structural support of the loader slot bearing 20. In some embodiments, the insert 60 is positioned in the slot 30 (e.g., between the truncated ball 40 and the annular housing 22), the insert has an insert arc section area 62 that conforms in shape to the slot arc section area 32 and a liner 80 molded between the truncated ball and the annular housing; and the liner 80 is molded over the insert 60.

As shown in FIGS. 1-2, the loader slot bearing 20 includes a truncated ball 40 installed therein. As shown in FIG. 2, the truncated ball 40 that has a convex spherical exterior surface 42 that has an axial width W2 extending axially (i.e., parallel to the central axis A) between a first axial ball-surface 42A and a second axial ball-surface 42B. The axial width W2 of the spherical exterior surface 42 is less than the lateral width W1 of the slot 30 so that the truncated ball 40 is initially slid into the slot 30 and positioned in the slot 30 so that the first axial ball-surface 42A and the second axial ball-surface 42B and the first axial housing-surface 22A and the second axial housing-surface 22B are parallel to one another. In some embodiments, the lateral width W1 is greater than the axial width W2 by no more than 0.020 inches. The truncated ball 40 is rotated so that the truncated ball 40 is retained by the inner bearing surface 26. The truncated ball 40 is angularly misalignable relative to the annular housing 22. The spherical exterior surface 42 has a first outer diameter D1 that is greater than the inside diameter D10 of the opening proximate to each of the first axial housing-surface 22A. The first radius RI of the second arc section 32 of the slot 30 is greater than the first outer diameter D1 divided by 2. In some embodiments, the first radius RI is greater than the first outer diameter D1 divided by 2 by no more than 0.040 inches. The first outer diameter D1 is less than or equal to a first inner diameter D5 of the interior area 24 of the annular housing 22, such that there is a clearance CC of 0.000 inches to 0.050 inches, preferably 0.010 to 0.050 inches between the spherical exterior surface 42 and the inner bearing surface 26 when the truncated ball 40 is installed and centered in the annular housing 22. In embodiments where the inner bearing surface 26 has a concave elliptical contour, the first outer diameter D1 is less than or equal to a first inner diameter D5 of the interior area 24 of the annular housing 22 at least one point, such that there is a clearance CC of 0.000 inches to 0.050 inches, preferably 0.010 to 0.050 inches between the spherical exterior surface 42 and the inner bearing surface 26 when the truncated ball 40 is installed and centered in the annular housing 22. The truncated ball 40 has a cylindrical bore 44 extending between the first axial ball-surface 42A and the second axial ball-surface 42B. The bore 44 is defined by an inner ball-surface 46.

Figure 9:
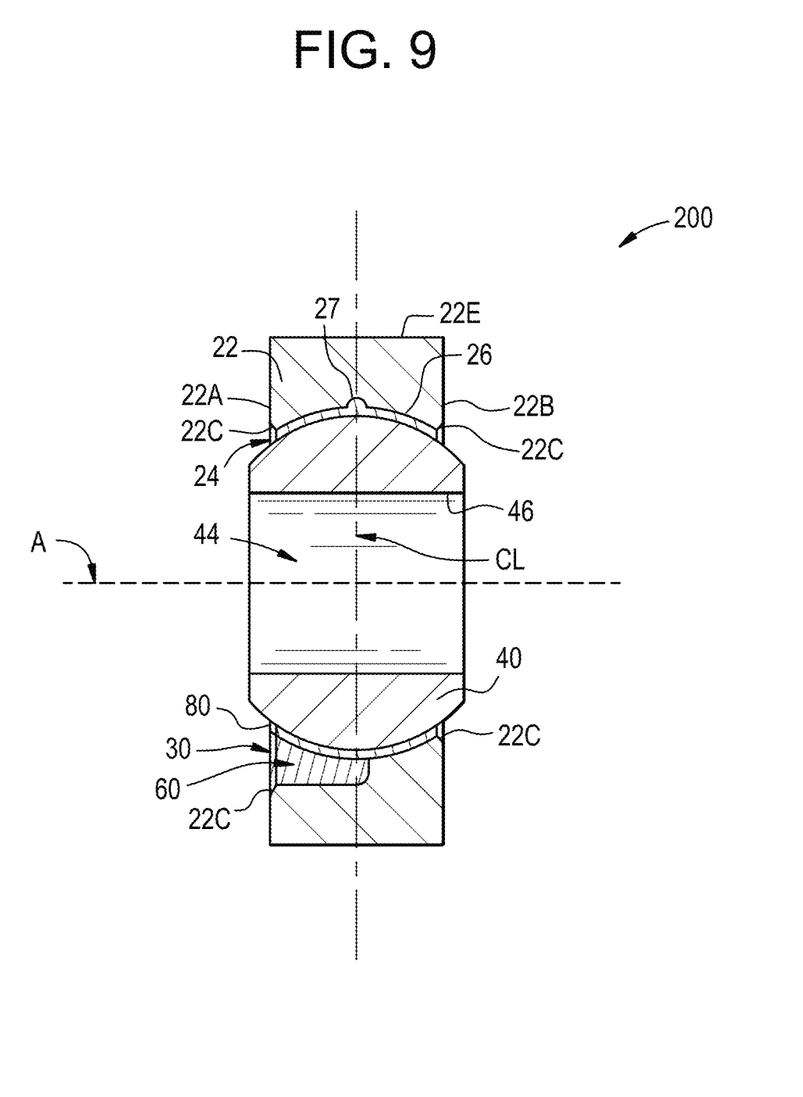
FIG. 9 is a cross sectional view of a cartridge embodiment of the loader slot bearing of the present invention.
Figure 10:
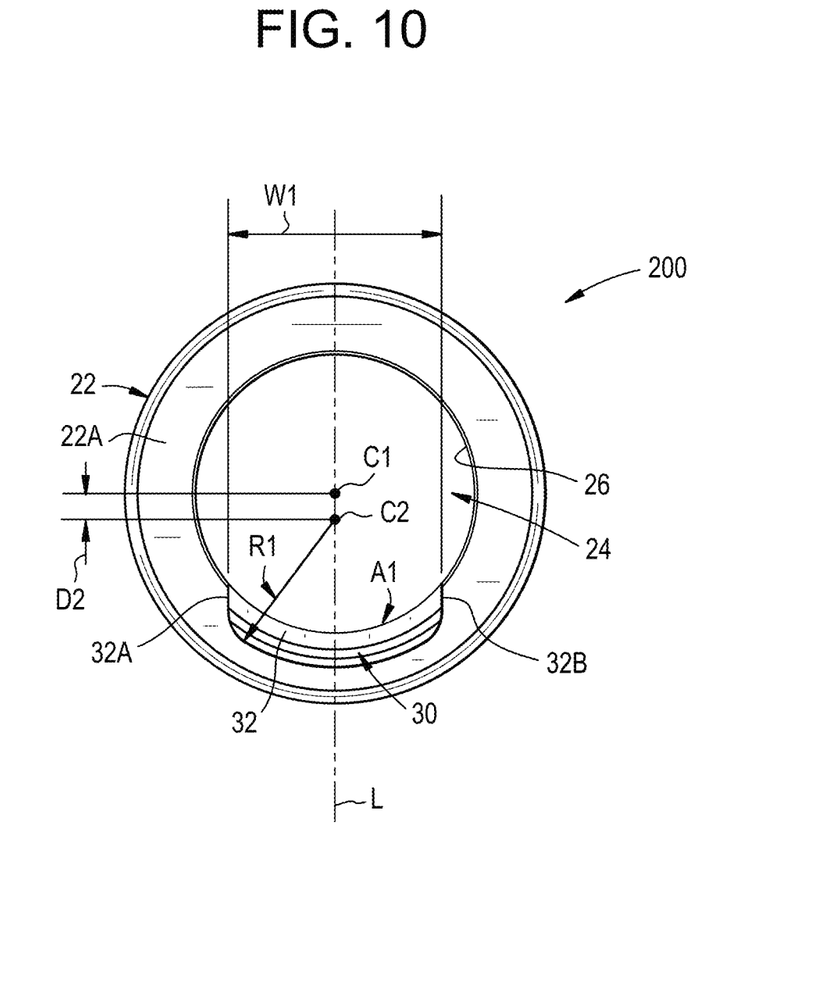
FIG. 10 is a front view of the loader slot bearing of FIG. 9.

As shown in FIGS. 2 and 9, the loader slot bearing 20 is configured so the truncated ball 40 can be dropped into the slot 30 so that a portion of the spherical exterior surface 42 (i.e., a portion extending continuously between the first axial ball-surface 42A and the second axial ball-surface 42B) is in engagement with a corresponding portion of the inner bearing surface 26. This so-called drop in configuration is enabled by the slot 30 extending axially into the annular housing 22 such that the axial depth D3 extends farther than a centerline CL (which is coaxial with the longitudinal axis L) of the truncated ball 40 by an axial depth differential G1. In some embodiments, the depth differential G1 is about 0.0050 inches or greater. A manufacturing option is producing the entry slot via conventional end milling that broaches the entry slot configuration completely or partially through one or more of the rod end faces, producing an entry slot that permits ball installation and removal on either side.

After the truncated ball 40 is positioned within the annular housing 22, a thermoplastic or thermosetting material is injection molded between the truncated ball 40 and the annular housing 22 to form a liner 80, as shown in FIGS. 1, 2, and 8. The liner 80 fills in the slot 30 (including the notch 34) and the clearance between the spherical exterior surface 42 and the inner bearing surface 26 to serve as a wear-resistance material that also provides further support and retention of the loader slot bearing 20. As a result of the injection molding, the liner 80 is fixedly adhered to the inner bearing surface 26 and is in sliding engagement with the convex spherical exterior surface 42 of the truncated ball 40. In some embodiments, as shown in FIG. 8, the insert 60 is installed in the slot 30, as discussed above, and the liner 80 is molded over the insert 60 and the inner bearing surface 26. In some embodiments, the liner 80 is formed of a plastic injection-moldable material including but not limited to nylon, acetal, polyetheretherketone, acrylonitrile butadiene styrene, polytetrafluoroethylene, and thermoplastic elastomer, with or without additives such as glass filler, fibers, lubricants, oil, greases, graphite, or any other known filler materials. In some embodiments, the liner 80 is formed of an injection-moldable material including but not limited to resins, polymers, graphite, composites, sintered powdered metals, ceramic composite, and curing structural foams.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A loader slot bearing comprising:
    an annular housing having a first axial housing-surface, a second axial housing-surface, and an interior area, the interior area having an inner bearing surface that extends between the first and second axial housing-surfaces, the inner bearing surface having a concave contour and a circumference at the first axial housing-surface;
    a single slot extending axially partway into the inner bearing surface from the first axial housing-surface, the single slot having a length that is less than the circumference; and
    a truncated ball having a convex exterior surface, the truncated ball being positioned in the interior area with the concave inner surface proximate the convex exterior surface so that the truncated ball and the annular housing are angularly misalignable relative to one another,
    wherein the truncated ball is positioned in the single slot and rotated so that the truncated ball is rotatably retained by the inner bearing surface,
    wherein the inner bearing surface has a first center of curvature located at an intersection of an axially extending central axis of the interior area and a radially extending longitudinal axis, and
    wherein the single slot has a radius of curvature measured from a second center of curvature located on a line parallel to and offset from the axially extending central axis to a radially outermost surface of the single slot.

2. The loader slot bearing of claim 1, wherein the inner bearing surface further comprises a radial groove centrally located axially between the first axial housing-surface and the second axial housing-surface and extending circumferentially around the interior area.

3. The loader slot bearing of claim 1, wherein the single slot further comprises a notch extending radially outward into the annular housing.

4. The loader slot bearing of claim 1, further comprising an insert positioned in the single slot.

5. The loader slot bearing of claim 1, further comprising a liner between the truncated ball and the annular housing.

6. The loader slot bearing of claim 1, further comprising an insert positioned in the single slot and a liner molded between the truncated ball and the annular housing, wherein the liner has a first hardness and the insert has a second hardness that is greater than the first hardness.

7. The loader slot bearing of claim 1, wherein the concave contour is elliptical.

8. A loader slot bearing comprising:
    an annular housing having a first axial housing-surface, a second axial housing-surface, and an interior area, the interior area having an inner bearing surface that extends between the first and second axial housing-surfaces, the inner bearing surface having a concave contour and a circumference at the first axial housing-surface;
    a single slot extending axially partway into the inner bearing surface from the first axial housing-surface, the single slot having a length that is less than the circumference;
    a truncated ball having a convex exterior surface, the truncated ball being positioned in the interior area with the concave inner surface proximate the convex exterior surface so that the truncated ball and the annular housing are angularly misalignable relative to one another, wherein the truncated ball is positioned in the single slot and rotated so that the truncated ball is rotatably retained by the inner bearing surface;
    an insert positioned in the single slot; and
    a liner molded between the truncated ball and the annular housing, wherein the liner has a first hardness and the insert has a second hardness that is greater than the first hardness.

9. The loader slot bearing of claim 8, wherein the inner bearing surface further comprises a radial groove centrally located axially between the first axial housing-surface and the second axial housing-surface and extending circumferentially around the interior area.

10. The loader slot bearing of claim 8, wherein the single slot further comprises a notch extending radially outward into the annular housing.

11. The loader slot bearing of claim 8, further comprising an insert positioned in the single slot.

12. The loader slot bearing of claim 8, wherein the concave contour is elliptical.

* * * * *